United States Patent
Batarseh

(10) Patent No.: US 12,338,700 B2
(45) Date of Patent: Jun. 24, 2025

(54) POWDER WELD FISHING TOOL

(71) Applicant: Saudi Arabian Oil Company, Dhahran (SA)

(72) Inventor: Sameeh Issa Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/467,438

(22) Filed: Sep. 14, 2023

(65) Prior Publication Data

US 2025/0092751 A1    Mar. 20, 2025

(51) Int. Cl.
| | |
|---|---|
| *E21B 31/00* | (2006.01) |
| *E21B 47/002* | (2012.01) |
| *E21B 47/024* | (2006.01) |
| *E21B 47/095* | (2012.01) |

(52) U.S. Cl.
CPC .......... *E21B 31/007* (2013.01); *E21B 47/002* (2020.05); *E21B 47/024* (2013.01); *E21B 47/095* (2020.05)

(58) Field of Classification Search
CPC .... E21B 31/007; E21B 47/002; E21B 47/095; E21B 47/024
See application file for complete search history.

(56) References Cited

U.S. PATENT DOCUMENTS

| | | | |
|---|---|---|---|
| 2,154,654 A * | 4/1939 | Armentrout | E21B 31/007 219/148 |
| 4,488,747 A | 12/1984 | Austin | |
| 8,307,900 B2 * | 11/2012 | Lynde | E21B 29/06 166/126 |
| 9,399,269 B1 * | 7/2016 | Zediker | E21B 29/00 |
| 10,301,912 B2 * | 5/2019 | De Witt | B08B 7/0042 |
| 11,053,771 B2 | 7/2021 | Carragher | |
| 2010/0326659 A1 | 12/2010 | Schultz et al. | |
| 2012/0074110 A1 | 3/2012 | Zediker et al. | |
| 2021/0262306 A1 | 8/2021 | Batarseh | |
| 2023/0265728 A1 | 8/2023 | Alqahtani et al. | |

OTHER PUBLICATIONS

International Search Report and Written Opinion in International Appln. No. PCT/US2024/046455, mailed on Nov. 18, 2024, 14 pages.

* cited by examiner

*Primary Examiner* — Tara Schimpf
*Assistant Examiner* — Daniel T Craig
(74) *Attorney, Agent, or Firm* — Fish & Richardson P.C.

(57) ABSTRACT

A downhole fishing tool for retrieving an object from a wellbore includes a main body assembly, one or more nozzles configured to dispose a cladding powder on the object when the object is proximate to the tool, and one or more lenses configured to direct a laser beam at the cladding powder disposed on the object, thereby welding the fishing tool to the object such that pulling the tool in an uphole direction pulls the object along with the fishing tool.

14 Claims, 4 Drawing Sheets

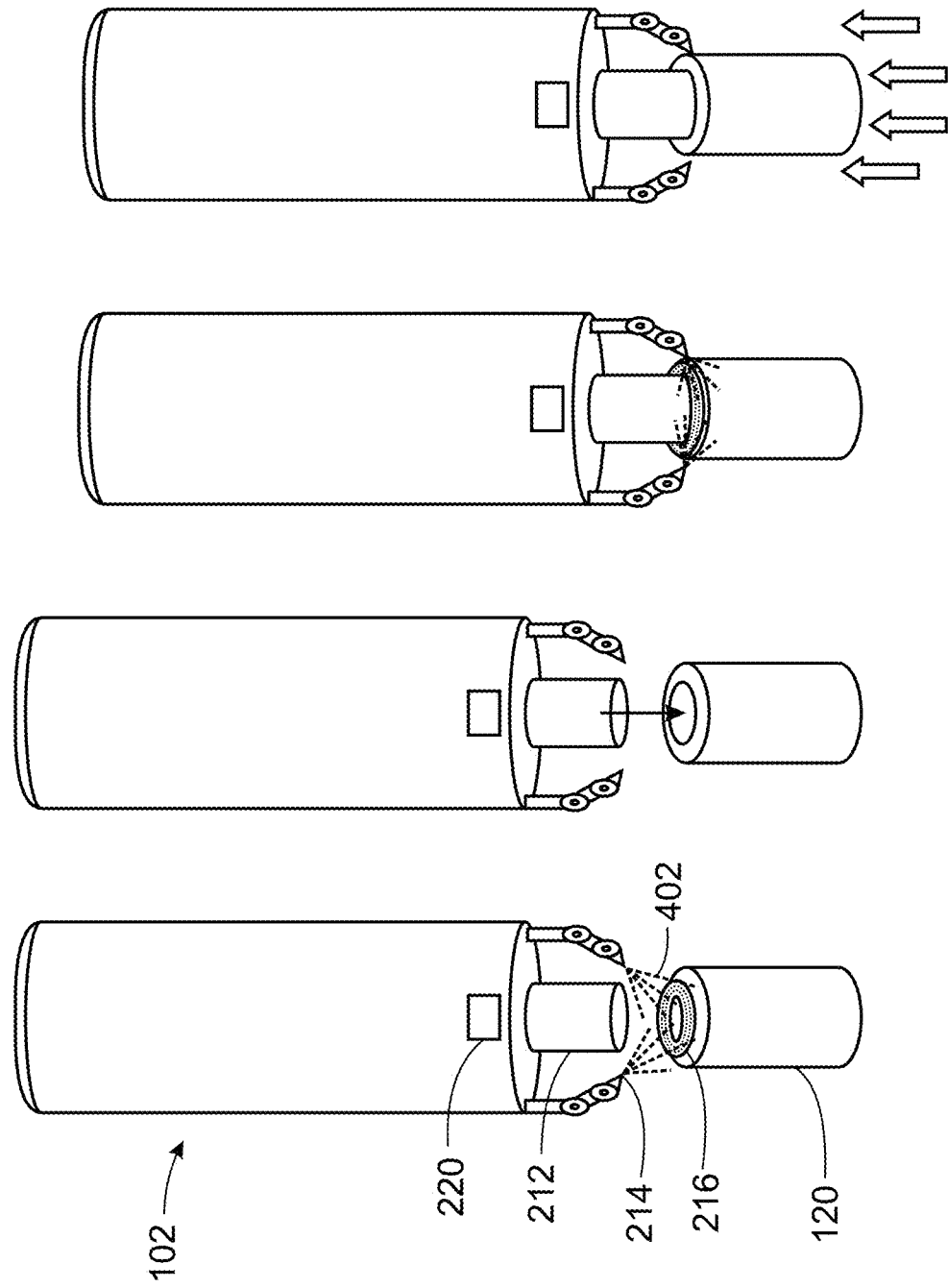

POWDER WELD FISHING TOOL

TECHNICAL FIELD

The present disclosure relates to subterranean wells, and more specifically, to removing objects from a subterranean well.

BACKGROUND

In subsurface well drilling and completion operations, it is not uncommon for an object (such as a tool, pipe, or fragment or component thereof) to fall into, get stuck, or unintentionally be left within a wellbore of a subterranean well. This fallen, stuck, or left object is sometimes known as a fish. The retrieval of such objects from a wellbore is referred to as fishing.

SUMMARY

Certain aspects of the subject matter herein can be implemented as a downhole fishing tool for retrieving an object from a wellbore. The tool includes a main body assembly, one or more nozzles configured to dispose a cladding powder on the object when the object is proximate to the tool, and one or more lenses configured to direct a laser beam at the cladding powder disposed on the object, thereby welding the fishing tool to the object such that pulling the tool in an uphole direction pulls the object along with the fishing tool.

Certain aspects of the subject matter herein can be implemented as a system for retrieving an object from a wellbore. The system includes a fishing tool and a conveyance connected to the fishing tool. The tool includes a main body assembly, one or more nozzles configured to dispose a cladding powder on the object when the object is proximate to the tool, and one or more lenses configured to direct a laser beam at the cladding powder disposed on the object, thereby welding the fishing tool to the object. The system is configured such that, after welding the fishing tool to the object, raising the fishing tool uphole, by the conveyance, pulls the object uphole along with the tool.

Certain aspects of the subject matter herein can be implemented as a method for retrieving an object from a wellbore. The method includes lowering, by a conveyance assembly comprising an optical fiber, a fishing tool downhole within a wellbore. The fishing tool includes a main body assembly, one or more nozzles configured to dispose a cladding powder on the object when the object is proximate to the tool, and one or more lenses configured to direct a laser beam at the cladding powder disposed on the object. The method includes spraying, when the tool is proximate the object, the cladding powder on the object from the one or more nozzles, and transmitting laser light through the optical fiber to the one or more lenses, such that the lens directs a laser beam on the cladding powder, thereby welding the fishing tool to the object. After welding the fishing tool to the object, the method includes raising the fishing tool uphole by the conveyance assembly, thereby pulling the object along with the fishing tool.

DESCRIPTION OF DRAWINGS

FIGS. 4A-4D are schematic illustrations of operation of a powder weld fishing tool in accordance with an embodiment of the present disclosure.

DETAILED DESCRIPTION

In laser powder welding, a laser beam is directly aimed at a cladding powder disposed on a surface. The cladding powder can be an alloy or other suitable material. The heat generated by the beam melts and welds the cladding powder to a first surface and a second surface, such that welded connections can be formed between the surfaces. In some embodiments, the cladding powder is disposed on the surface by a nozzle. By laser-welding the powder layer and subsequently disposing further layers of powder on top of the welded powder and then laser-welding the added layer of powder, and then repeating the process as many times as is optimal, a strong weld including multiple welded layers can be formed.

Retrieval of a fish or other object from a wellbore can be difficult, expensive, or time consuming. In some embodiments of the present disclosure, a system, method, or apparatus includes or comprises a downhole fishing tool comprising a nozzle configured to dispose a cladding powder on the fish or other object when the object is proximate to the tool, and a lens configured to direct a laser beam at the cladding powder, thereby welding the fishing tool to the object such that, when welded, pulling the tool in an uphole direction pulls the object along with the fishing tool. In some embodiments, the tool includes a cylindrical rod or other protuberance, composed of a metallic alloy or another suitable material, extending from the tool and nozzle is configured to dispose the cladding powder on the protuberance when the protuberance is in contact with the object. In some embodiments, the lens is a conic lens configured such that the laser beam is in the form of a ring which surrounds the protuberance. In this way, heavier and/or larger fish can be retrieved than with conventional fishing tools, this increasing efficacy and safety of fishing operations.

Figure 1:
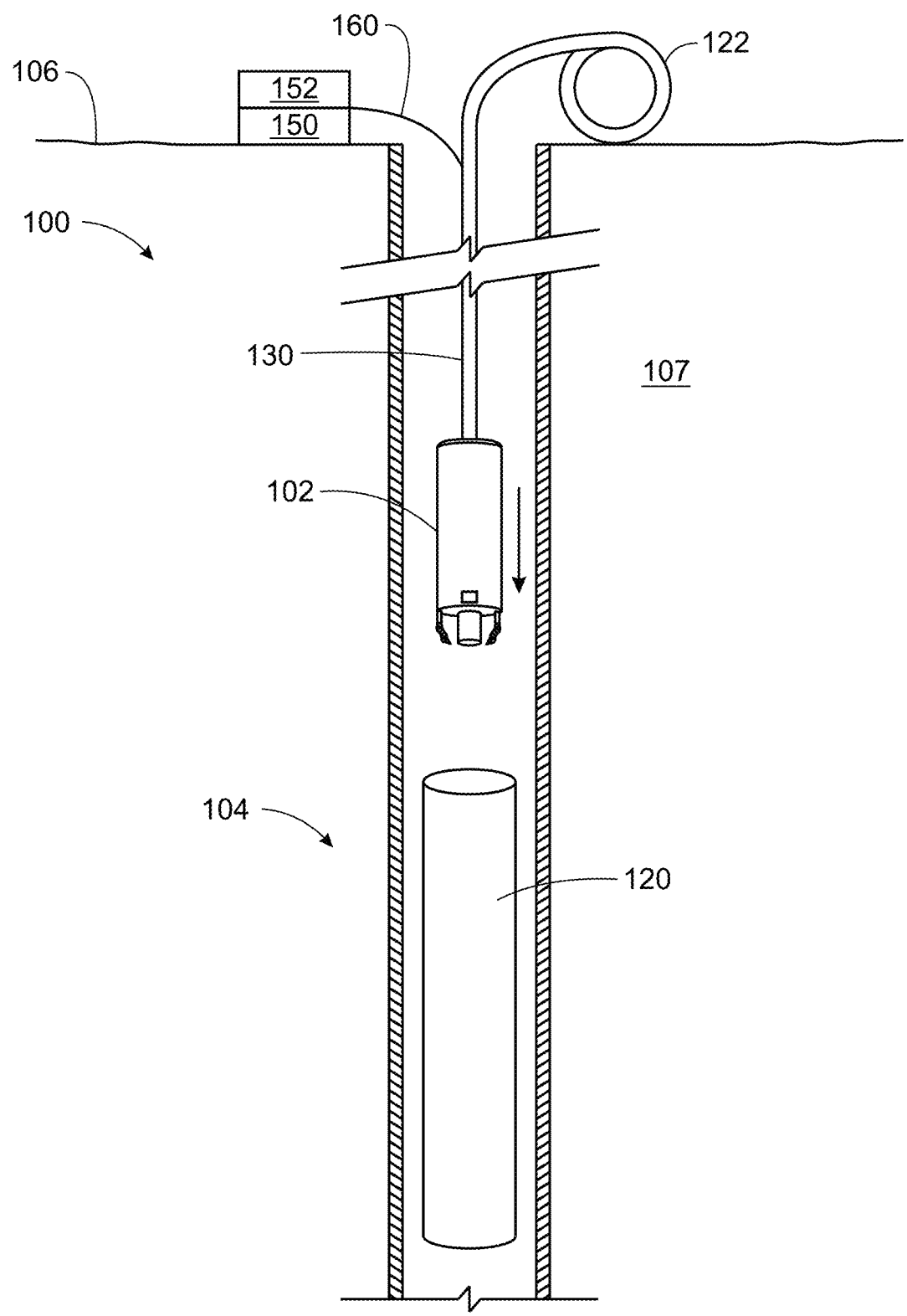
FIG. 1 is a schematic illustration of a fishing system comprising a powder weld fishing tool disposed in a wellbore in accordance with an embodiment of the present disclosure.

FIG. 1 is a schematic illustration of a fishing system 100 in accordance with an embodiment of the present disclosure, comprising a powder weld fishing tool 102 disposed in a wellbore 104 drilled from a surface 106 into a subterranean zone 107. Conveyance 130 can lower tool 102 in downhole direction (for example, towards lost downhole object 120 (fish) within wellbore 104) and can raise tool 102 in an uphole direction. Conveyance 130 in the illustrated embodiment is a wireline supplied from a spool 122, but in other embodiments conveyance 130 could be coiled tubing or other suitable conveyance such as a downhole tractor. Wellbore 104 is illustrated as a vertical well but can be a horizontal, lateral, or other well or well portion or well segment. Wellbore 104 can be uncased or partially or fully cased.

As described in further detail below, tool 102 can include a nozzle configured to dispose a cladding powder on the object when the object is proximate to the tool, and a lens configured to direct a laser beam at the cladding powder, thereby welding tool 102 to object 120 such that subsequently pulling tool 102 by conveyance 130 in an uphole direction pulls object 120 uphole along with tool 102. Also as described further below, tool 102 can include one or more sensors such as a camera or other optical sensor, acoustic sensor, and/or other sensors and/or mechanisms such as rotational heads or wire feed assemblies.

System 100 can further include a laser source module 150 which is configured to transmit laser light along optical fiber 160. Optical fiber 160 is connected to tool 102 and provides the laser light directed by the lens assembly. In some embodiments, optical fiber 160 can be integrated as a component of conveyance 130. System 100 can further include a control module 152 that can receive data the sensors and transmit control signals to wire feed assemblies, rotational head tool, and/or other mechanisms, via optical fiber 160 or another suitable wired or wireless connection. In some embodiments, laser source module 150 and control module 152 are positioned at a surface location. In some embodiments, some or all of the components of laser source module 150 or control module 152 can be positioned downhole during some or all of the fishing process. In some embodiments, the functions of source module 150 and control module 152 can be integrated into a combined laser source and control module.

Figure 2:
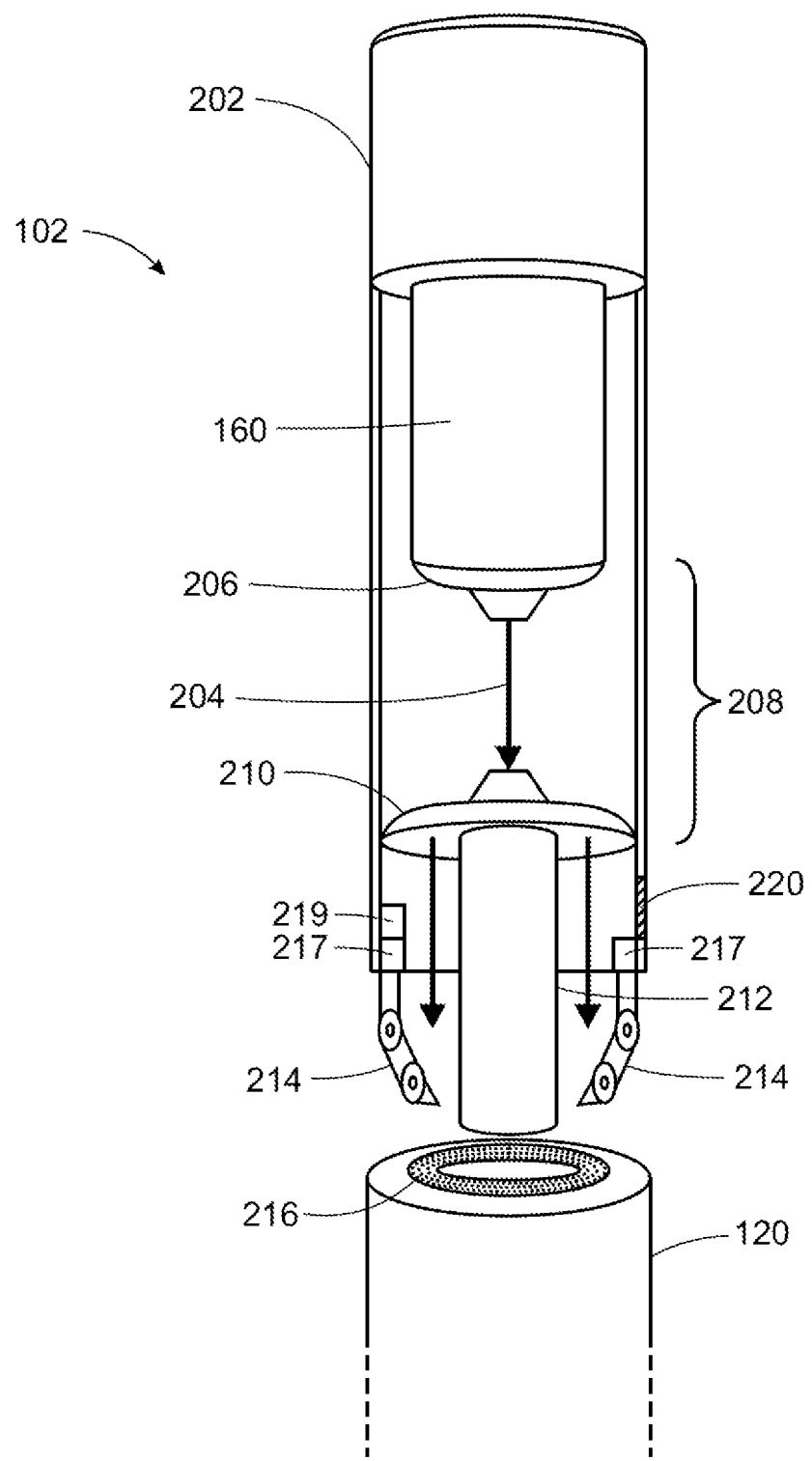
FIG. 2 is a schematic illustrations of a powder weld fishing tool in accordance with an embodiment of the present disclosure.

FIG. 2 is a schematic illustration showing further detail of laser cladding fishing tool 102 in accordance with an embodiment of the present disclosure. Tool 102 includes a main body assembly 202 through which optical fiber 160 is disposed. Main body assembly 202 can be configured to protect the internal components of tool 102 from impacts with the wellbore and other hazardous downhole conditions. Laser beam 204 emitted from optical fiber 160 is directed to first lens 206 of lens assembly 208. First lens 206 can in some embodiments be a conic lens and can control the shape, size, direction, and geometry of laser beam 204 so as to direct laser beam 204 to second lens 210. Second lens 210 can in some embodiments be a conic lens and can be configured to collimate and shape laser beam 204 into a ring shape (shown as laser beam ring 216). In the illustrated embodiment, tool 102 includes a protuberance 212 which is a metallic cylinder extending from a downhole end of tool 102, and second lens 210 is configured such that laser beam ring 216 surrounds the downhole end of protuberance 212, and would be focused on a surface of an object positioned proximate to or in contact with the downhole end of protuberance 212.

Tool 102 further includes powder nozzles 214 configured to spray a cladding powder from powder reservoirs 217. The cladding powder can in some embodiments can be comprised of a metallic material such as Inconel or another suitable austenitic nickel-chromium-based alloy. The nozzles can be of any suitable commercially available cladding powder nozzle, and can be powered by, for example, gas pressure from a pressure conduit in conveyance 130.

In some embodiments, tool 102 can include a gas purging system to clear the one or more nozzles in the event they become clogged. In some embodiments, tool 102 can include a one or more fluid nozzle assemblies 219 for injecting nitrogen gas or other optically clear fluid into the space between the powder nozzles and the object 120 to clear debris and provide an optically clear pathway for cladding powder and laser beam 204 to reach object 120 as it exits tool 102. In some embodiments, the system can include one or more packers to isolate the wellbore above tool 102 and maintain the clear fluid in place at the interface between tool 102 and object 120.

In operation, as described in further detail below, nozzles 214 can be configured to spray a cladding powder on the surface of object 120 or other object proximate or in contact with positioned proximate to or in contact with the downhole end of protuberance 212. Laser beam ring 216 surrounding protuberance 212 can melt the powder prior to or after contact of the protuberance with the object, thereby melting the cladding powder and welding tool 102 to the fish. When so welded, uphole movement of tool 102 will pull the fish uphole along with the tool.

In the illustrated embodiment tool 102 includes one or more sensors 220. Sensors 220 can include one or more cameras or other optical sensors, acoustic sensors, pressure sensors, or other suitable sensors configured to enable the operator to determine the location, distance, size, shape, and/or orientation of object 120 relative to tool 102 and the wellbore, as the tool is lowered downhole and/or during welding operations. For example, an acoustic sensor can be utilized when visibility is limited, prior to injection of the optically clear fluid for laser welding. Sensors 220 can be controlled by, and can transmit data to and receive data from, control module 152.

Figure 3:
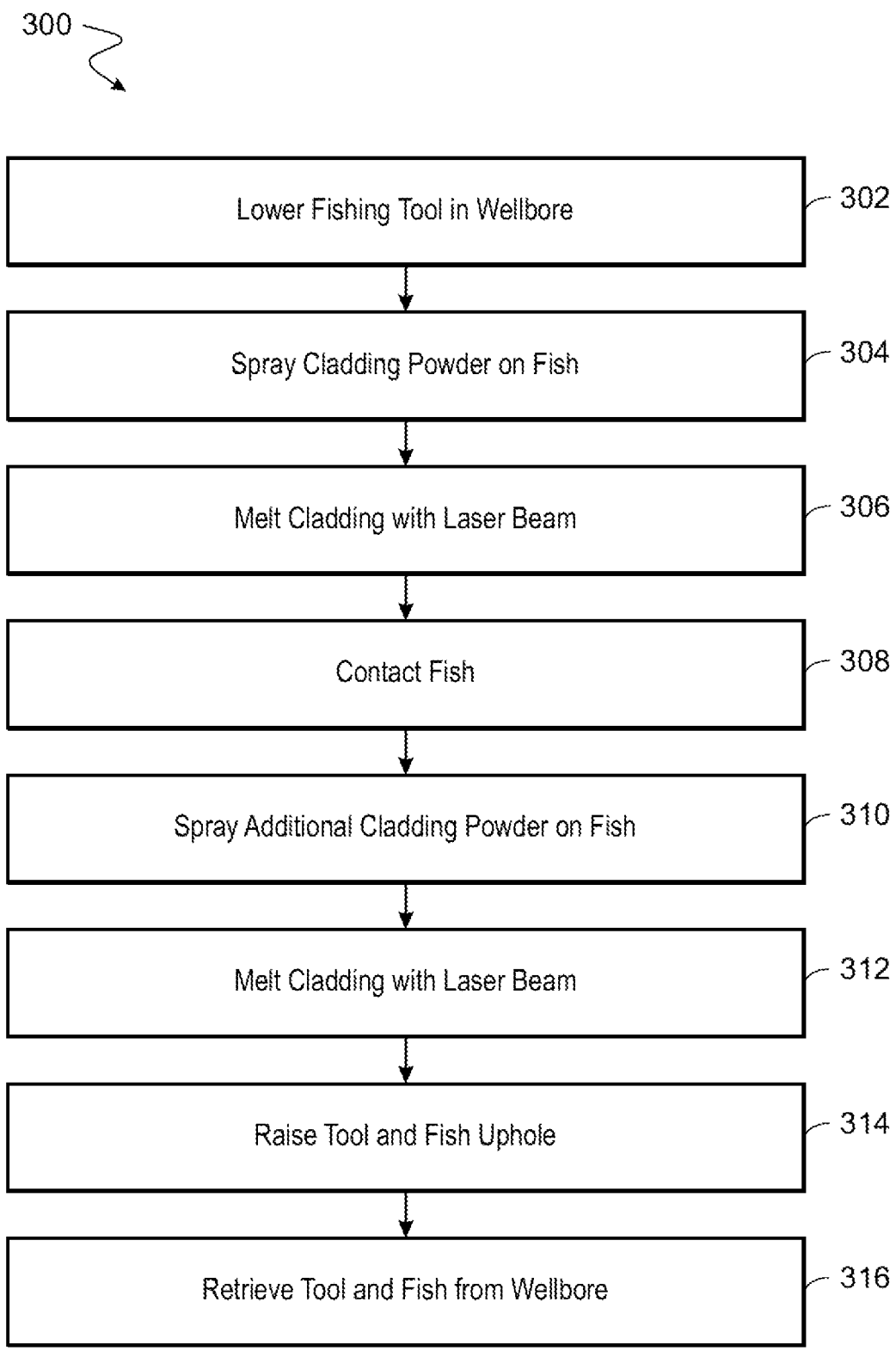
FIG. 3 process flow diagram of a method of operating a powder weld fishing tool in accordance with an embodiment of the present disclosure.

FIG. 3 process flow diagram of a method of operating a laser cladding fishing tool in accordance with an embodiment of the present disclosure. The method of FIG. 3 is described in reference to the tool and system described in reference to FIGS. 1, 2, and 4A-4B; however, the method can be used with other suitable tools and systems.

The method begins with step 302 in which laser cladding fishing tool 102 is lowered by a conveyance 130 downhole within wellbore 104 until its downhole end is proximate object 120 or other downhole object, as shown in FIG. 4A, guided by data from acoustic, visual, and/or other data from sensors 220. At step 304, as also shown in FIG. 4A, cladding powder 402 is deposited from nozzles 214 onto the surface of the object, and the cladding powder melted at step 306 by focusing laser beam ring 216 on the powder, resulting in evenly-distributed melted powder in a ring shape. For example, for the initial powder deposition of step 304, tool 102 can be lowered towards object 120 until the downhole end of protuberance 212 a suitable distance from the surface of object 120 to enable the powder to be deposited and welded. The suitable distance can depend on the characteristics of the stuck object, of the nature of the fluid between the tool and the object, the nozzle type, and other factors. In some embodiments, a suitable distance can be, for example, between two and five centimeters.

At step 308, the laser and nozzles are powered off and the tool is lowered further so as to contact the fish, and the melted powder forms an initial connection between the tool and the fish. As shown in FIG. 4B, in the illustrated embodiment, the tool contacts the fish at the downhole end of protuberance 212, forming the initial welded contact. As shown in FIG. 4C, and proceeding to step 310, cladding powder 402 is again deposited from nozzles 214 onto the surface of the object, and at step 312 the additional cladding powder is melted by focusing laser beam ring 216 on the powder, in the contact region around protuberance 212. In this way, the tool is further bonded with the fish, with a welded seam surrounding the edge of protuberance 212, forming a strong connection between the tool and the fish.

At step 314, as shown in FIG. 4D, the fishing tool, with the fish welded to it, is pulled uphole, pulling the fish along with the tool. At step 316, the tool and fish can be retrieved from the wellbore. At the surface, the fish can be separated from the tool using conventional methods.

The term "uphole" as used herein means in the direction along a wellbore from its distal end towards the surface, and "downhole" as used herein means the direction along a wellbore from the surface towards its distal end. A downhole location means a location along a wellbore downhole of the surface.

While this specification contains many specific implementation details, these should not be construed as limitations on the scope of any claims or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

EXAMPLES

In a first aspect, a downhole fishing tool for retrieving an object from a wellbore includes a main body assembly, one or more nozzles configured to dispose a cladding powder on the object when the object is proximate to the tool, and one or more lenses configured to direct a laser beam at the cladding powder disposed on the object, thereby welding the fishing tool to the object such that pulling the tool in an uphole direction pulls the object along with the fishing tool.

In a second aspect according to the first aspect, the tool includes a protuberance, and the tool is configured such that the protuberance is a point of contact with the object when the tool is in contact with the object and the one or more nozzles are configured to dispose the cladding powder at an interface between the protuberance and the object when the protuberance is in contact with the object.

In a third aspect according to the second aspect, the one or more lenses are configured to direct the laser beam as a ring around the protuberance.

In a fourth aspect according to any of the first to the third aspect, the protuberance is a cylindrical rod disposed on a downhole end.

In a fifth aspect according to any of the first to the fourth aspect, the fishing tool further includes one or more sensors configured to determine physical parameters indicative of the location and orientation of the object in relation to the fishing tool.

In a sixth aspect according to any of the first to the fifth aspect, the one or more sensors includes an acoustic sensor.

In a seventh aspect according to any of the first to sixth aspects, the one or more sensors includes a camera.

In an eighth aspect according to any of the first to seventh aspects, the tool further includes a nozzle assembly from which nitrogen gas can be injected into a space between the tool and the object.

In a ninth aspect, a system for retrieving an object from a wellbore includes a fishing tool and a conveyance connected to the fishing tool. The tool includes a main body assembly, one or more nozzles configured to dispose a cladding powder on the object when the object is proximate to the tool, and one or more lenses configured to direct a laser beam at the cladding powder disposed on the object, thereby welding the fishing tool to the object. The system is configured such that, after welding the fishing tool to the object, raising the fishing tool uphole, by the conveyance, pulls the object uphole along with the tool.

In a tenth aspect according to the ninth aspect, the tool includes a protuberance and the tool is configured such that the protuberance is a point of contact with the object when the tool is in contact with the object, and the one or more nozzles are configured to dispose the cladding powder at an interface between the protuberance and the object when the protuberance is in contact with the object.

In an eleventh aspect according to the tenth aspect, the one or more lenses are configured to direct the laser beam as a ring around the protuberance.

In an twelfth aspect according to the tenth or eleventh aspect, the protuberance is a cylindrical rod disposed on a downhole end of the tool.

In a thirteenth aspect according to any of the first to the twelfth aspect, the tool includes one or more sensors configured to determine physical parameters indicative of the location and orientation of the object in relation to the fishing tool.

In a fourteenth aspect according to any of the first to the thirteenth aspect, the one or more sensors includes an acoustic sensor.

In a fifteenth aspect according to any of the first to the fourteenth aspect, the one or more sensors includes a camera.

In sixteenth aspect according to any of the first to the fifteenth aspect, the tool includes a nozzle assembly from which nitrogen gas can be injected into a space between the tool and the object.

In a seventeenth aspect, a method for retrieving an object from a wellbore includes lowering, by a conveyance assembly comprising an optical fiber, a fishing tool downhole within a wellbore. The fishing tool includes a main body assembly, one or more nozzles configured to dispose a cladding powder on the object when the object is proximate to the tool, and one or more lenses configured to direct a laser beam at the cladding powder disposed on the object. The method includes spraying, when the tool is proximate the object, the cladding powder on the object from the one or more nozzles, and transmitting laser light through the optical fiber to the one or more lenses, such that the lens directs a laser beam on the cladding powder, thereby welding the fishing tool to the object. After welding the fishing tool to the object, the method includes raising the fishing tool uphole by the conveyance assembly, thereby pulling the object along with the fishing tool.

In an eighteenth aspect according to the seventeenth aspect, the tool includes a protuberance at its downhole end. Lowering the fishing tool downhole includes lowering the fishing tool such that the protuberance is in contact with the object. Spraying the cladding powder comprises spraying the cladding powder on an interface between the protuberance and the object.

In an nineteenth aspect according to the eighteenth aspect, transmitting the laser light includes directing the laser beam as a ring around the protuberance.

In a twentieth aspect according to any of the seventeenth to nineteenth aspects, the method further includes determining, by sensors on board the tool, physical parameters indicative of the location and orientation of the object in relation to the tool.

What is claimed is:

1. A downhole fishing tool for retrieving an object from a wellbore, the fishing tool comprising:
   a main body assembly;
   a metallic protuberance positioned downhole of the main body assembly when the fishing tool is disposed in the wellbore and extending such that, when the fishing tool is lowered downhole to the object, a downhole end of the protuberance is a point of contact of the fishing tool with the object;
   one or more nozzles configured to dispose a cladding powder on the object when the object is proximate to the fishing tool; and
   one or more lenses disposed between the main body assembly and the protuberance and configured to direct a laser beam ring around the protuberance at the cladding powder disposed on the object, thereby melting a ring of powder to form a welded seam surrounding the protuberance to weld the protuberance to the object such that pulling the fishing tool in an uphole direction pulls the object along with the fishing tool.

2. The fishing tool of claim 1, wherein the protuberance is a cylindrical rod.

3. The fishing tool of claim 1, further comprising one or more sensors configured to determine physical parameters indicative of the location and orientation of the object in relation to the fishing tool.

4. The fishing tool of claim 1, wherein the one or more sensors comprises an acoustic sensor.

5. The fishing tool of claim 1, wherein the one or more sensors comprises a camera.

6. The fishing tool of claim 1, further comprising a nozzle assembly from which nitrogen gas can be injected into a space between the fishing tool and the object.

7. A system for retrieving an object from a wellbore, the system comprising:
   a fishing tool comprising:
     a main body assembly;
     a metallic protuberance positioned downhole of the main body assembly when the fishing tool is disposed in the wellbore and extending such that, when the fishing tool is lowered downhole to the object, a downhole end of the protuberance is a point of contact of the fishing tool with the object;
     one or more nozzles configured to dispose a cladding powder on the object when the object is proximate to the fishing tool; and
     one or more lenses disposed between the main body assembly and the protuberance and configured to direct a laser beam ring around the protuberance at the cladding powder disposed on the object, thereby melting a ring of powder to form a welded seam surrounding the protuberance to weld the protuberance to the object such that pulling the tool in an uphole direction pulls the object along with the fishing tool; and a conveyance connected to the fishing tool, wherein the system is configured such that, after welding the protuberance to the object, raising the fishing tool uphole, by the conveyance, pulls the object uphole along with the fishing tool.

8. The system of claim 7, wherein the protuberance is a cylindrical rod.

9. The system of claim 7, wherein the fishing tool further comprises one or more sensors configured to determine physical parameters indicative of the location and orientation of the object in relation to the fishing tool.

10. The system of claim 7, wherein the one or more sensors comprises an acoustic sensor.

11. The system of claim 7, wherein the one or more sensors comprises a camera.

12. The system of claim 7, wherein the fishing tool further comprises a nozzle assembly from which nitrogen gas can be injected into a space between the fishing tool and the object.

13. A method for retrieving an object from a wellbore, the method comprising:
   lowering, by a conveyance assembly comprising an optical fiber, a fishing tool downhole within a wellbore, the fishing tool comprising:
     a main body assembly;
     a protuberance positioned downhole of the main body assembly when the fishing tool is disposed in the wellbore and extending such that, when the fishing tool is lowered downhole to the object, a downhole end of the protuberance is a point of contact of the fishing tool with the object;
     one or more nozzles configured to dispose a cladding powder on the object when the object is proximate to the fishing tool; and
     one or more lenses disposed between the main body assembly and the protuberance and configured to direct a laser beam ring around the protuberance at the cladding powder disposed on the object;
   spraying, when the tool is proximate the object, the cladding powder on the object from the one or more nozzles;
   transmitting laser light through the optical fiber to the one or more lenses, such that the lens directs a laser beam on the cladding powder, thereby melting a ring of powder to form a welded seam surrounding the protuberance to weld the protuberance to the object; and
   after welding the protuberance to the object, raising the fishing tool uphole by the conveyance assembly, thereby pulling the object along with the fishing tool.

14. The method of claim 13, further comprising determining, by sensors on board the fishing tool, physical parameters indicative of the location and orientation of the object in relation to the fishing tool.

* * * * *